(12) United States Patent
König

(10) Patent No.: US 6,781,498 B2
(45) Date of Patent: Aug. 24, 2004

(54) COIL FOR AN ELECTRICAL MACHINE, AND METHOD FOR PRODUCING A COIL

(75) Inventor: Werner König, Herrenberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/074,231

(22) Filed: Feb. 14, 2002

(65) Prior Publication Data

US 2002/0121829 A1 Sep. 5, 2002

(30) Foreign Application Priority Data

Feb. 14, 2001 (DE) .......................................... 101 06 719

(51) Int. Cl.$^7$ .............................................. H01F 27/28
(52) U.S. Cl. ...................................... 336/180; 336/223
(58) Field of Search ........................ 174/109; 336/200, 336/198, 83, 15

(56) References Cited

U.S. PATENT DOCUMENTS

| 2,930,014 A | * | 3/1960 | Van Der Hook et al. |
| 3,622,818 A | * | 11/1971 | Payen .......................... 310/13 |
| 5,209,416 A | * | 5/1993 | LeCompte .................... 242/47 |
| 5,221,060 A | * | 6/1993 | Couvillion et al. ......... 242/159 |

* cited by examiner

*Primary Examiner*—Anh Mai
(74) *Attorney, Agent, or Firm*—Crowell & Moring LLP

(57) ABSTRACT

A coil for a particularly compact coil for an electrical machine, in which coil an electrical conductor is wound with a number of turns, which are arranged one above the other in a number of layers, with the turns in a first layer being arranged parallel alongside one another, and the turns in a second layer being inclined through a predetermined inclination angle (a), with respect to the turns in the first layer, at a predetermined point and being arranged parallel alongside one another.

11 Claims, 2 Drawing Sheets

COIL FOR AN ELECTRICAL MACHINE, AND METHOD FOR PRODUCING A COIL

BACKGROUND AND SUMMARY OF THE INVENTION

This application claims the priority of Application No. 101 06 719.4, filed Feb. 14, 2001, in Germany, the disclosure of which is expressly incorporated by reference herein.

The invention relates to a coil for an electrical machine, in particular an electric motor for a vehicle. Furthermore, the invention relates to the use of the coil for a stator of an electrical machine, a production method for a coil, and an apparatus for producing the coil.

Normally, coils for electrical machines or drives are wound from thick wire. The development in the field of electrical machines is currently aimed at achieving ever greater utilization of the coil, in particular at achieving an ever greater power and an greater torque for a given machine size. One condition for a high power density is a very compact coil.

Conventionally wound coils require a sufficiently large physical space, because of wire crossings resulting from an arbitrary arrangement of turns and layers. Such arbitrary wire crossings lead to spaces between the turns and layers, which limits the power density or the wire or conductor cross section.

It is an object of the invention to provide a coil which is particularly compact. Furthermore, a particularly simple method and a particularly simple apparatus are specified for producing such a coil.

According to the invention, a coil is provided for an electrical machine, in which an electrical conductor or a wire is wound with a number of turns, which are arranged one above the other in a number of layers, with the turns in a first layer being arranged parallel to one another, and the turns in a second layer being inclined, at a point which is predetermined, at an inclination angle, which is also predetermined, with respect to the turns in the first layer, and being arranged parallel alongside one another. This allows the turns to cross in a defined manner at a specific point, so that all the turns are arranged so that they lie particularly close alongside one another, and spaces are reliably avoided. Such a particularly compact coil allows a coil with a larger conductor or wire cross section to be formed in the same physical space, so that the $I^2R$ losses in the coil are particularly small. Furthermore, the motor or the machine may be designed to be smaller. Particularly in the case of a vehicle, this results in a reduction in weight and physical space.

The bending angle or kink angle is advantageously chosen so that the or each turn in the second layer is inclined by at least one pitch width. This allows, for example, the turns in the second layer to be arranged in the cavities or intermediate spaces in the first layer. The turns are thus arranged in a particularly space-saving manner. Depending on the type and configuration of the coil, individual turns may be inclined by more than one pitch width. The last or first turn in one of the layers is preferably inclined by the entire pitch width, which is formed by the total number of pitches in an adjacent layer. This means that the inclined turn is in this case inclined from the first turn to the last turn of the adjacent layer, in particular the lower layer, and is thus inclined obliquely over all the turns or pitches in the lower layer.

The coil start and coil end are expediently passed out jointly at one end winding, with the turns in the second layer at the opposite end winding being inclined at the bending angle. This allows the coil to be arranged in a space-saving manner, in particular in a stator of an electric motor. In this case, the end winding with the coil start and end is arranged as close as possible to the interconnection ring, with the end winding (which has the turn crossings) being arranged opposite, and hence exposed. Depending on the purpose for which the coil will be used, the bend, which can be predetermined, of the turns in one layer may be designed to alternate, for example with the first layer at the upper end winding, the second layer at the lower end winding, or on a longitudinal side of the coil. The end windings of the coil are advantageously domed outwards. This makes it possible to install the rotor particularly easily, for example in a stator of an electric motor.

In one preferred embodiment, the turns in a single layer are arranged parallel alongside one another, and partially superimposed. Such an arrangement of the turns with overlapping layers allows the coil to have a trapezoidal cross section, which allows a particularly space-saving arrangement of a number of coils in a particularly complex form, for example in a stator.

The second-mentioned object is achieved, in the case of a method for producing the coil, according to the invention in that the electrical conductor for the or each turn is bent through a bending angle, which can be predetermined, at a point which can be predetermined before the turn is wound onto a coil former. Such bending of the winding wire or conductor at a point before being wound onto the coil former means that very much less force need be applied. Furthermore, this reliably avoids any bulging caused by crossings of the turns, that is to say no spaces are formed when the coil is wound, so that said coil is as compact as possible. In one particularly advantageous embodiment, the turns in a first layer are wound parallel alongside one another, with the turns in the second layer being inclined through the bending angle with respect to the first layer and being arranged parallel alongside one another. This allows, in particular, the turns in the second layer to be arranged to avoid any possible spaces in the turns of the first layer, in that the turns in the second layer are bent such that the respective turn is arranged between two turns in the first layer, and thus in the spaces or depressions between them. Depending on the embodiment of the coil, the bending angle is chosen such that the or each turn in the second layer is preferably inclined by at least one pitch width. This results in an arrangement in which the intermediate spaces are filled as much as possible, and the turns in an individual plane are arranged in as plane-parallel a manner as possible. Undesirable crossings are reliably avoided. An individual turn in one of the layers is inclined by the total pitch width, which is formed by the total number of pitches in an adjacent layer. In particular, the first turn in a layer is inclined at an appropriate bending angle over the entire width (=overall pitch width) of the lower layer. In this case, this layer has one turn or partial turn which runs obliquely over the entire pitch width.

Depending on the application of the coil, for example in a stator of an electric motor, the coil start and coil end are preferably passed out jointly at one end winding, with the turns in the second layer at the opposite end winding being inclined at the bending angle before being wound onto the coil former. This ensures that crossings occur only on one longitudinal side or at one end winding. Thus, depending on the nature and shape of the coil, it is possible to choose that side which is advantageous for a compact configuration and arrangement for the subsequent application. In a further alternative embodiment, the turns in a single layer are preferably wound parallel alongside one another, partially superimposed. Such a trapezoidal winding makes it possible for a number of coils to be arranged in a particularly space-saving arrangement alongside one another.

A further object is achieved according to the invention by an apparatus for producing the coil for an electrical machine, in which a guide body is provided for winding an electrical conductor onto a coil former, with each turn of the electrical conductor being bent by means of the guide body through a bending angle, which can be predetermined, at a point which can be predetermined before that turn is wound onto the coil former. In this case, the guide body is preferably arranged such that it can move. Alternatively, the guide body may comprise a motor for moving two bending pins. Such an apparatus or winding machine, whose design is particularly simple, allows a coil to be wound in a particularly space-saving manner, so that it is particularly compact. To this end, during the winding process, in particular when the process of winding the coil is stopped in a defined manner at a predetermined point, the guide body is shifted by a predetermined amount for each turn, for example in a region between grippers, in such a manner that this ensures that the winding wire or the conductor is inclined in a manner corresponding to the bending angle, before being wound onto the coil former. Alternatively, instead of shifting the guide body, it is also possible to provide a motor which moves two bending pins forward per turn at a predetermined point during the winding process, and these bending pins move in such a manner that the resulting guided winding wire is inclined through the bending angle before being wound onto the coil former.

The advantages which are achieved by the invention are, in particular, that defined kinking or bending of the winding wire or of the conductor for each turn (before being wound onto the coil former) at a predetermined point on the coil, in particular at that point or in that region of the conductor which forms one of the end windings, avoids turns crossing randomly, and thus reliably avoids spaces. This results in a coil which is as compact as possible. In a compact coil such as this, a coil with a larger wire cross section can be formed in the same physical space, thus reducing losses. On the other hand, a compact coil such as this likewise makes it possible to design a motor, which is intended to hold the coil, to be smaller or more compact, thus once again allowing the weight physical space to be reduced.

Other objects, advantages and novel features of the present invention will become apparent from the following detailed description of the invention when considered in conjunction with the accompanying drawings.

BRIEF DESCRIPTION OF THE DRAWINGS

Exemplary embodiments of the invention will be explained in more detail with reference to a drawing, in which.

DETAILED DESCRIPTION OF THE PREFERRED EMBODIMENT

Mutually corresponding parts are provided with the same reference symbols in all the figures.

Figure 1:
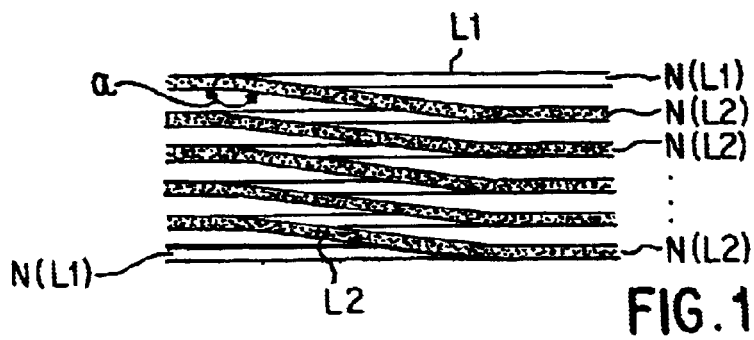
FIG. 1 is a schematic illustration of a coil having turns, which are arranged in a number of layers one above the other, and have an inclination angle, in a plan view of an end winding.

FIG. 1 shows a coil 1 having a number of turns N(L1, L2), which are arranged one above the other in at least two layers L1 and L2. In this case, the turns N(L1) in the first, and hence lower, layer L1 are represented by thin lines. The turns N(L2) in the second, and upper, layer L2 are represented by a thick line.

The turns N(L1) in the first layer L1 are arranged parallel alongside one another. The turns N(L2) in the second layer L2 are arranged as a second layer L2 above the turns N(L1) in the first layer L1. In this case, the turns N(L2) in the second layer L2 are inclined through an inclination angle a, which can be predetermined, at a point which can be predetermined with respect to the turns N(L1) in the first layer L1, and are arranged parallel alongside one another. By way of example, the inclination angle a is chosen such that the inclination or bend of the respective turn N(L2) in the second layer L2 is at least one pitch width. In other words: the turn N(L2) in the second layer L2 is bent at a defined point before being wound on, so that, when being wound on, it is not wound above the same turn N(L1) in the lower, first layer, but in fact changes the pitch, that is to say the turn N(L2) runs over the same turn N(L1) in the lower layer at the winding start and ends with the inclination angle a above the adjacent turn N(L1) in the lower layer L1 due to the bend which is produced at a defined point. Such plane-parallel winding of the turns N(L1, L2) in the respective layer L1, L2 of the coil 1 allows the coil 1 to have a particularly compact form, with undefined crossings, and spaces resulting from them, being reliably avoided.

Figure 2:
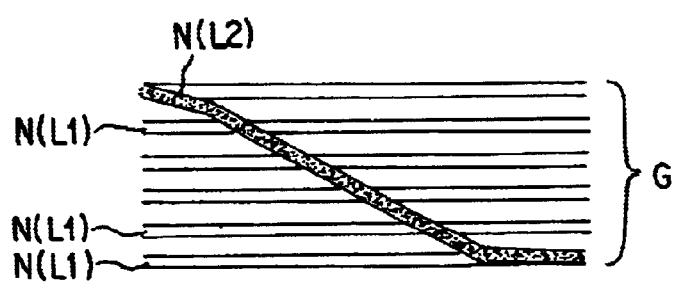
FIG. 2 is a schematic illustration of a further coil with a turn with an inclination running over a number of pitches, in a plan view of an end winding.
Figure 3:
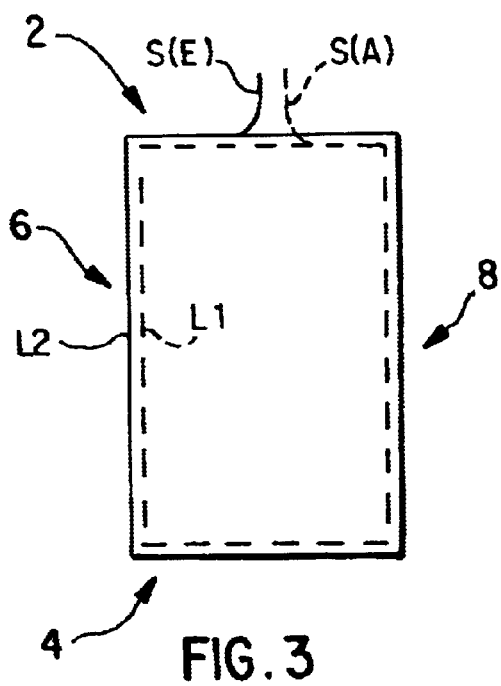
FIG. 3 is a schematic illustration of a front view of a coil as shown in FIG. 1.

Depending on the type and configuration, the respective turn N(Ln) in one of the layers Ln may have an inclination with more than one pitch width. For example, in FIG. 2, an individual turn N(L2) in the second layer L2 is inclined over the entire pitch width G of the adjacent layer L1. The entire pitch width G is in this case formed by the total number of pitches or turns N(L1) in the lower layer L1. FIG. 3 shows a front view of the coil 1. In this case, the coil start S(A) and coil end S(E) of the coil 1 are passed out jointly, for example, at an upper end winding 2. This results in a contact ring, which is not illustrated in any more detail, being arranged directly for reliable connection of the coil 1. At the opposite end of the coil 1, at the lower end winding 4, the inclinations (which are illustrated in FIG. 1) of the turns N(L2) in the second layer L2 are configured with the bending or inclination angle a. Depending on the nature and construction of the coil 1, the bends or inclinations of the turns N(L2) may also be produced on another side, for example at the upper end winding 2 or on one of the longitudinal sides 6 or 8 of the coil 1, or alternately on a number of sides of the coil 1.

Figure 4:
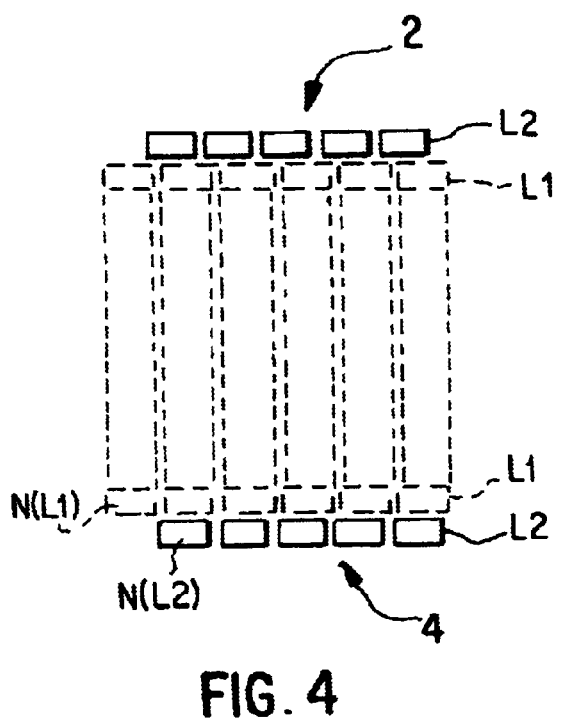
FIG. 4 is a schematic illustration of a longitudinal section through the coil shown in FIG. 3.

FIG. 4 shows a longitudinal section through the coil 1 shown in FIG. 3. This shows the pitch change produced by the inclination of the turns N(L2) in the second layer L2. The turns N(L2) in the second layer L2 are preferably arranged between two turns N(L1) in the first layer L1. Such winding of the coil 1 prevents the creation of spaces, in a particularly simple manner.

Figure 5:
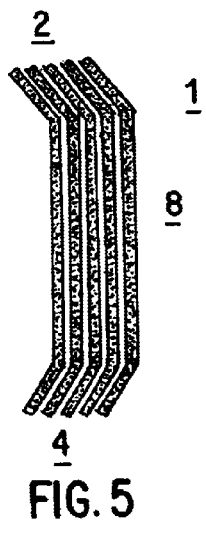
FIG. 5 is a schematic illustration of a side view of a further coil.

FIG. 5 shows a side view of the coil 1. In this case, the end windings 2 and 4 are each domed or bent outwards. In one preferred application of the coil 1 in a stator (which is not illustrated) of an electric motor, such doming of the end windings 2 and 4 allows a rotor to be installed particularly easily and reliably.

Figure 6A:
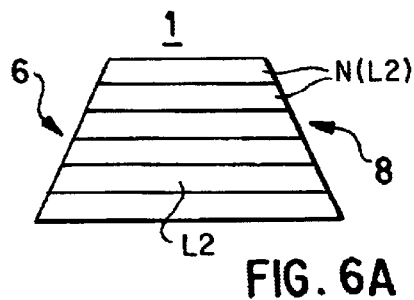
FIGS. 6A, 6B is a schematic illustration of a plan view of a further coil.
Figure 6B:
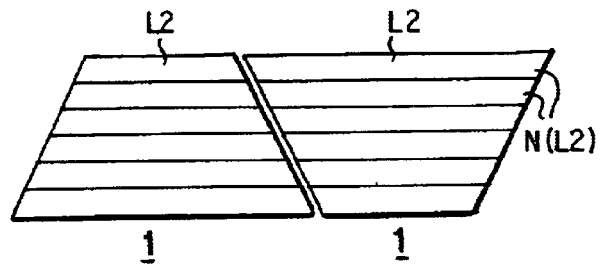
Figure 7:
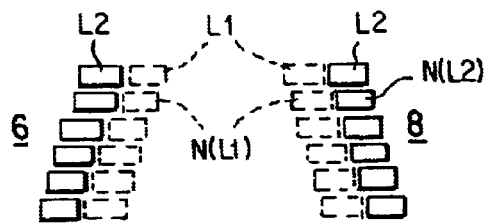
FIG. 7 a cross section of the coil as shown in FIG. 6A.
Figure 8:
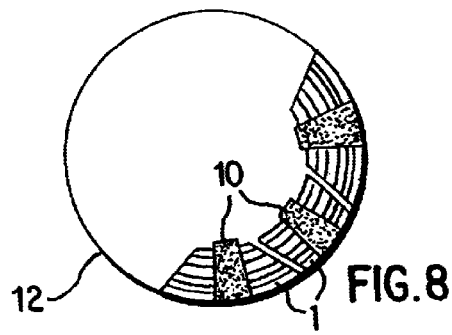
FIG. 8 a stator having a number of coils as shown in FIG. 6A.

FIGS. 6A, 6B and 7 show a further alternative form of a coil 1, in which the turns N(L1) or N(L2) in an individual respective layer L1 or L2 are wound parallel alongside one another or one above the other, partially superimposed. This results in a trapezoid, in plan view, as shown in FIG. 6A. This winding is also referred to as a trapezoidal winding. An arrangement of a number of trapezoidal coils 1 alongside one another is in this case particularly space-saving. To achieve this, the coils 1 are arranged alongside one another such that the short base edge of the trapezoid of the one coil 1 is adjacent to the long base edge of the trapezoid of the adjacent coil 1, as is shown in FIG. 6B. In cross section, the partial superimposition of the turns N(L1) or N(L2) results in a step, as is shown in FIG. 7. By way of example, FIG. 8 shows a number of coils 1 arranged in slots 10 in a stator 12 of a machine which is not illustrated, for example an electric motor. In this case, the coils 1, in particular trapezoidal coils 1, are arranged alternately with a short and long base edge in the slots 10 in the stator 12. For simple installation, a coil 1 with a long base edge is in each case initially arranged above every alternate slot 10, in the direction of the circumference 14 of the stator 12. After this, a coil 1 with a short base edge is in each case arranged in the other slots 10, in the direction of the circumference of the stator 12. This results in the coils 1 being arranged in the stator 12 in a manner which fills the space particularly well. In particular, if the spatial conditions in the stator 12 are the same, such trapezoidal coils 1 with appropriate inclinations at one of the end windings 2 or 4, as shown above, allow coils with a larger wire cross section or with a larger number of turns N(L1, L2) or with a larger number of layers L1, L2.

Figure 9:
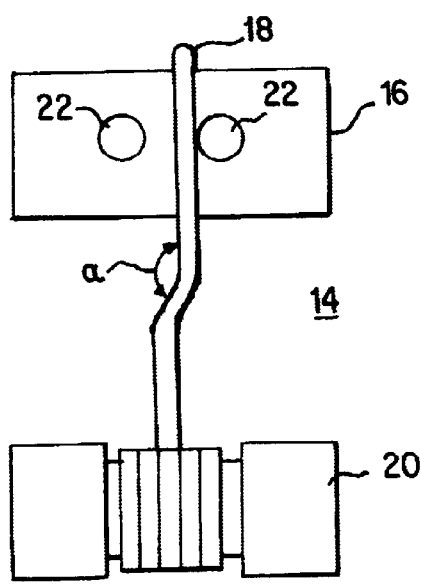
FIG. 9 is a schematic illustration of an apparatus for producing a coil.

FIG. 9 shows, schematically, one possible embodiment of an apparatus 14 for producing the coil 1. The apparatus 14 has a guide body 16 for winding an electrical conductor 18 onto a coil former 20. The guide body 16 is in this case arranged such that it can move. When the apparatus 14 is being used for winding, the electrical conductor 18 is wound in a number of turns N(L1) around the coil former 20, by rotating the coil former 20 a number of times, in order to wind on the first layer L1. This results in the turns N(L1) being wound parallel alongside one another. In order to wind the second layer L2 of the coil 1, the winding process is interrupted at a point which can be predetermined, in particular after a specific length of the already wound-on conductor 18, in order, by shifting the guide body 16 by means of two grippers or bending pins 22, to bend the conductor 18 through a bending or inclination angle a before it is wound onto the coil former 20. In this case, this process is repeated for each turn N(L2) in the second layer 2. This ensures that all the turns N(L2) and N(L1) are arranged as closely as possible alongside one another and one above the other. This largely avoids spaces. Depending on the inclination angle a that is set, the respective turn N(L2) is bent or inclined through at least one or more pitch widths.

Instead of interrupting the winding process in order to bend the wire or conductor 18 for the relevant turns N(L1) or N(L2), the winding process may be carried out continuously. To do this, the guide body 18 comprises a motor, which is not illustrated in any more detail and which moves forwards repeatedly by distances which can be predetermined in order to produce the bend or inclination of the winding wire or of the conductor 18, in order to move past grippers or bending pins 22 which, depending on their position or their angle, bend the conductor 18 which is passing through between them, through the inclination angle a, before said conductor 18 is wound onto the coil former 20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coil arrangement for an electrical machine, in which an electrical conductor is wound with a plurality of turns (N(L1), N(L2), in each of at least two layers with the plurality of turns of a second layer being positioned above the plurality of turns of a first layer, wherein the turns (N(L1)) in said first layer (L1) are arranged parallel to one another, and the turns (N(L2)) in the second layer (L2) are inclined, at a predetermined point at a predetermined inclination angle (a), with respect to the turns ((N(L1)) in the first layer (L1), and wherein the plurality of turns in the second layer are arranged parallel alongside one another wherein the inclination angle (a) is such that each turn (N(L2)) in the second layer (L2) is inclined by at least one pitch width.

2. The coil arrangement according to claim 1, wherein an individual turn (N(L1), N(L2)) in one of the layers (L1, L2) is inclined by a total pitch width (G), which is formed by a total number of pitches in an adjacent layer (L1, L2).

3. A The coil arrangement according to claim 1, wherein a coil start (S(A)) and coil (S(E)) are passed out jointly at one end winding, with the turns (N(L2)) in the second layer (L2) at an opposite end winding being inclined at the inclination angle (a).

4. The coil arrangement according to claim 3, wherein the end windings are domed outwards.

5. The coil arrangement according to claim 1, wherein the plurality of turns (N(L1), N(L2)), in one of said layers (L1, L2) are arranged parallel alongside one another, partially superimposed.

6. A method for producing a coil arrangement for an electrical machine, comprising the steps of:

winding an electrical conductor on a coil former with a first plurality of turns to form a second layer on and above said layer, wherein the step of forming said second layer includes the step of bending the electrical conductor through a predetermined bending angle at a predetermined point before said second plurality of turns is wound on said coil former.

7. The method according to claim 6, wherein the turns in the first layer are wound parallel alongside one another, with the turns in the second layer being inclined through the bending angle with respect to the first layer and being arranged parallel alongside one another.

8. The method according to claim 6, wherein the bending angle is such that each turn in the second layer is inclined by at least one pitch width.

9. The method according to claim 6, wherein one turn in one of the layers is inclined by the total pitch width, which is formed by the total number of pitches in an adjacent layer.

10. The method according to claim 7, wherein a coil start and coil end are passed out jointly at one end, with the turns in the second layer at the opposite end winding being inclined at the bending angle before being wound on to the coil former.

11. The method according to claim 6, wherein the turns in a single layer are wound parallel alongside one another, partially superimposed.

* * * * *